US009507457B2

(12) United States Patent
Hong et al.

(10) Patent No.: US 9,507,457 B2
(45) Date of Patent: Nov. 29, 2016

(54) METHOD OF DETERMINING TOUCH COORDINATE AND TOUCH PANEL ASSEMBLY FOR PERFORMING THE SAME

(75) Inventors: Won-Ki Hong, Suwon-si (KR); Jee-Hong Min, Seongnam-si (KR); Seong-Mo Hwang, Seongnam-si (KR); Il-Ho Lee, Hwaseong-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 919 days.

(21) Appl. No.: 13/016,122

(22) Filed: Jan. 28, 2011

(65) Prior Publication Data

US 2012/0075235 A1   Mar. 29, 2012

(30) Foreign Application Priority Data

Sep. 29, 2010   (KR) .............................. 2010-0094130

(51) Int. Cl.
*G06F 3/045* (2006.01)
*G06F 3/041* (2006.01)

(52) U.S. Cl.
CPC ............ *G06F 3/0416* (2013.01); *G06F 3/045* (2013.01); *G06F 2203/04104* (2013.01)

(58) Field of Classification Search
USPC ................................................ 345/173, 174
See application file for complete search history.

(56) References Cited

U.S. PATENT DOCUMENTS

| 7,295,191 B2* | 11/2007 | Kraus et al. ................. 345/173 |
| 7,492,358 B2 | 2/2009 | Chi et al. |
| 8,106,892 B2* | 1/2012 | Felder et al. ................. 345/174 |
| 2005/0017959 A1 | 1/2005 | Kraus et al. |
| 2009/0109191 A1 | 4/2009 | Felder et al. |
| 2010/0117983 A1* | 5/2010 | Lin et al. ....................... 345/174 |
| 2010/0117986 A1* | 5/2010 | Yang ............................. 345/174 |
| 2010/0141604 A1* | 6/2010 | Cai et al. ...................... 345/174 |
| 2011/0025642 A1* | 2/2011 | Tada et al. .................... 345/174 |

FOREIGN PATENT DOCUMENTS

JP   2009-176114   8/2009

OTHER PUBLICATIONS

Korean Office Action Dated Sep. 23, 2016.

* cited by examiner

*Primary Examiner* — Alexander Eisen
*Assistant Examiner* — Nan-Ying Yang
(74) *Attorney, Agent, or Firm* — F. Chau & Associates, LLC

(57) ABSTRACT

A method of determining a touch coordinate in a touch panel includes detecting a touch cell among a plurality of touch cells, wherein the plurality of touch cells are defined by a plurality of areas in the touch panel in which a first touch electrode and a second touch electrode overlap with each other, detecting a touch position in the detected touch cell based on a first electrical signal measured at least one of a plurality of terminals of the first and second touch electrodes, determining a number of touches based on a distance between a first touch and a second touch, determining expected touch coordinates corresponding to the number of touches, and determining the touch coordinate based on a second electrical signal measured at least one of the plurality of terminals of the first and second touch electrodes and the expected touch coordinates.

15 Claims, 14 Drawing Sheets

METHOD OF DETERMINING TOUCH COORDINATE AND TOUCH PANEL ASSEMBLY FOR PERFORMING THE SAME

CROSS-REFERENCE TO RELATED APPLICATION

This application claims priority under 35 U.S.C. §119 to Korean Patent Application No. 10-2010-0094130, filed on Sep. 29, 2010, the disclosure of which is incorporated by reference herein in its entirety.

BACKGROUND

1. Technical Field

Exemplary embodiments of the present invention relate to a method of determining a touch coordinate, and a touch panel for performing the method. More particularly, exemplary embodiments of the present invention relate to a method of determining a touch coordinate capable of recognizing multi-touches and a touch panel for performing the method.

2. Discussion of the Related Art

Display apparatuses including an integrated touch panel are widely used. In an integrated touch panel, a touch signal is inputted by a touch providing means such as a stylus pen or a finger, without an additional separate input device such as a remote controller connected to the stylus pen. A touch panel may be integrally disposed on various types of display panels such as, for example, the display panel of a cellular phone or a computer monitor.

Commonly used touch panels include capacitive type touch panels, resistive type touch panels, and infrared type touch panels.

A resistive type touch panel includes an upper substrate including a plurality of upper electrodes, and a lower substrate including a plurality of lower electrodes crossing the upper electrodes. A plurality of cells is defined in an area in which the upper electrodes and lower electrodes overlap with each other.

When the upper substrate is pressed by the stylus pen or the finger, the upper substrate deforms and makes contact with the lower substrate. As a result, a voltage drops at the contact position. Various interrogation voltages may be sequentially applied to the upper and lower electrodes so that x-axis and y-axis coordinates of the contact position may be accurately detected.

Since the touch panel may detect only a single touch in a single cell, a large number of cells may be required to increase a resolution of the touch panel. Accordingly, the number of upper and lower electrodes, and the number of wires connected to the upper and lower electrodes may be increased. As a result, the width of the bezel of the display panel may be increased.

In addition, as the size of the display panel increases, the number of upper and lower electrodes, and the number of wires connected to the upper and lower electrodes may increase, thus increasing the width of the bezel of the display panel. When the width of the bezel of the display panel increases, the number of panels obtained from a mother glass may be decreased, decreasing productivity.

SUMMARY

Exemplary embodiments of the present invention provide a method of determining a touch coordinate capable of accurately determining the touch coordinates of multi-touches, decreasing the number of touch electrodes and wires connected to the touch electrodes, and decreasing the width of a bezel of the display panel.

Exemplary embodiments of the present invention also provide a touch panel assembly for performing the method of determining a touch coordinate.

In an exemplary embodiment of the present invention, a method of determining a touch coordinate in a touch panel includes detecting a touch cell among a plurality of touch cells, wherein the plurality of touch cells are defined by a plurality of areas in the touch panel in which a first touch electrode and a second touch electrode overlap with each other. The method further includes detecting a touch position in the detected touch cell based on a first electrical signal measured at least one of a plurality of terminals of the first and second touch electrodes. The method further includes determining a number of touches based on a distance between a first touch and a second touch. The method further includes determining expected touch coordinates corresponding to the number of touches. The method further includes determining the touch coordinate based on a second electrical signal measured at least one of the plurality of terminals of the first and second touch electrodes, and the expected touch coordinates. The touch panel includes a first substrate and a second substrate overlapping the first substrate. The first substrate includes at least one first touch electrode. The second substrate includes at least one second touch electrode.

In an exemplary embodiment, the first touch electrode may include a first terminal extending along a first side of the first touch electrode in a first direction, and a second terminal extending along a second side of the first touch electrode in the first direction. The first and second sides of the first touch electrode oppose each other. The second touch electrode may include a third terminal extending along a first side of the second touch electrode in a second direction crossing the first direction, and a fourth terminal extending along a second side of the second touch electrode in the second direction. The first and second sides of the second touch electrode oppose each other.

In an exemplary embodiment, the first electrical signal may be a voltage.

In an exemplary embodiment, detecting the touch position in the detected touch cell may include applying a source voltage to the first terminal and a ground voltage to the second terminal, and determining a first coordinate based on a voltage measured at the third terminal, and applying the source voltage to the third terminal and the ground voltage to the fourth terminal, and determining a second coordinate based on a voltage measured at the first terminal.

In an exemplary embodiment, determining the number of touches may include setting the number of touches to one upon determining that the distance between the first and second touches is about 0, and setting the number of touches to two upon determining that the distance between the first and second touches is greater than about 0.

In an exemplary embodiment, determining the number of touches may include determining a first distance in the first direction based on a resistance of the first touch electrode, and determining a second distance in the second direction based on a resistance of the second touch electrode.

In an exemplary embodiment, the first distance may be determined by applying source voltage to the first terminal and a ground voltage to the second terminal. The second distance may be determined by applying the source voltage to the third terminal and the ground voltage to the fourth terminal.

In an exemplary embodiment, determining the expected touch coordinates may include setting the touch position as a central point between the first and second touches upon determining that the number of touches is two, and calculating the expected touch coordinates using the central point and the distance between the first and second touches.

In an exemplary embodiment, the expected touch coordinates may include a first expected touch coordinate and a second expected touch coordinate. The first expected touch coordinate may be {P1=(xm−dx/2, ym−dy/2), P2=(xm+dx/2, ym+dy/2)}. The second expected touch coordinate may be {P1=(xm−dx/2, ym+dy/2), P2=(xm+dx/2, ym−dy/2)}. Herein, P1 is a coordinate of the first touch, P2 is a coordinate of the second touch, xm is a first coordinate of the central point, ym is a second coordinate of the central point, dx is a first distance between the first and second touches in the first direction, and dy is a second distance between the first and second touches in the second direction.

In an exemplary embodiment, the second electrical signal may be a voltage.

In an exemplary embodiment, determining the touch coordinate may include applying a source voltage to the first terminal and a ground voltage to the second terminal, and measuring a first voltage at the third terminal and a second voltage at the fourth terminal.

In an exemplary embodiment, determining the touch coordinate may include calculating a difference between the first and second voltages upon determining that the number of touches is two.

In an exemplary embodiment of the present invention, a touch panel assembly includes a touch panel and a touch panel driver. The touch panel includes a first substrate and a second substrate. The first and second substrates overlap with each other. The first substrate includes at least one first touch electrode. The second substrate includes at least one second touch electrode. The touch panel driver is configured to detect a touch cell among a plurality of touch cells. The plurality of touch cells are defined by a plurality of areas in the touch panel in which the first and second touch electrodes overlap with each other. The touch panel driver is further configured to detect a touch position in the detected touch cell based on a first electrical signal measured at least one of a plurality of terminals of the first and second touch electrodes. The touch panel driver is further configured to determine a number of touches based on a distance between a first touch and a second touch. The touch panel driver is further configured to determine expected touch coordinates corresponding to the number of touches. The touch panel driver is further configured to determine a touch coordinate based on a second electrical signal measured at least one of the plurality of terminals of the first and second touch electrodes, and the expected touch coordinates. The touch panel driver is further configured to drive the touch panel.

In an exemplary embodiment, the first substrate may include at least two first touch electrodes. The first and second touch electrodes overlapping with each other may form at least two cells.

In an exemplary embodiment, the second substrate may include at least two second touch electrodes. The first and second touch electrodes overlapping with each other may form at least two cells.

In an exemplary embodiment, the first touch electrode may extend in a first direction. The second touch electrode may extend in a second direction crossing the first direction. The first substrate may include at least two first touch electrodes. The second substrate may include at least two second touch electrodes. The first and second touch electrodes overlapping with each other may form at least four cells.

In an exemplary embodiment, the first touch electrode may include a first terminal extending along a first side of the first touch electrode in a first direction, and a second terminal extending along a second side of the first touch electrode in the first direction. The first and second sides of the first touch electrode oppose each other. The second touch electrode may include a third terminal extending along a first side of the second touch electrode in a second direction, and a fourth terminal extending along a second side of the second touch electrode in the second direction. The second direction crosses the first direction. The first and second sides of the second touch electrode oppose each other.

In an exemplary embodiment, the touch panel driver may be configured to determine the touch coordinate based on a first voltage measured at the third terminal and a second voltage measured at the fourth terminal, upon applying a source voltage to the first terminal and a ground voltage to the second terminal.

In an exemplary embodiment, the touch panel driver may be configured to determine the touch coordinate based on a difference between the first and second voltages, upon determining that the number of touches is two.

In an exemplary embodiment, the first and second electrical signals may be voltages.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Figure 1:
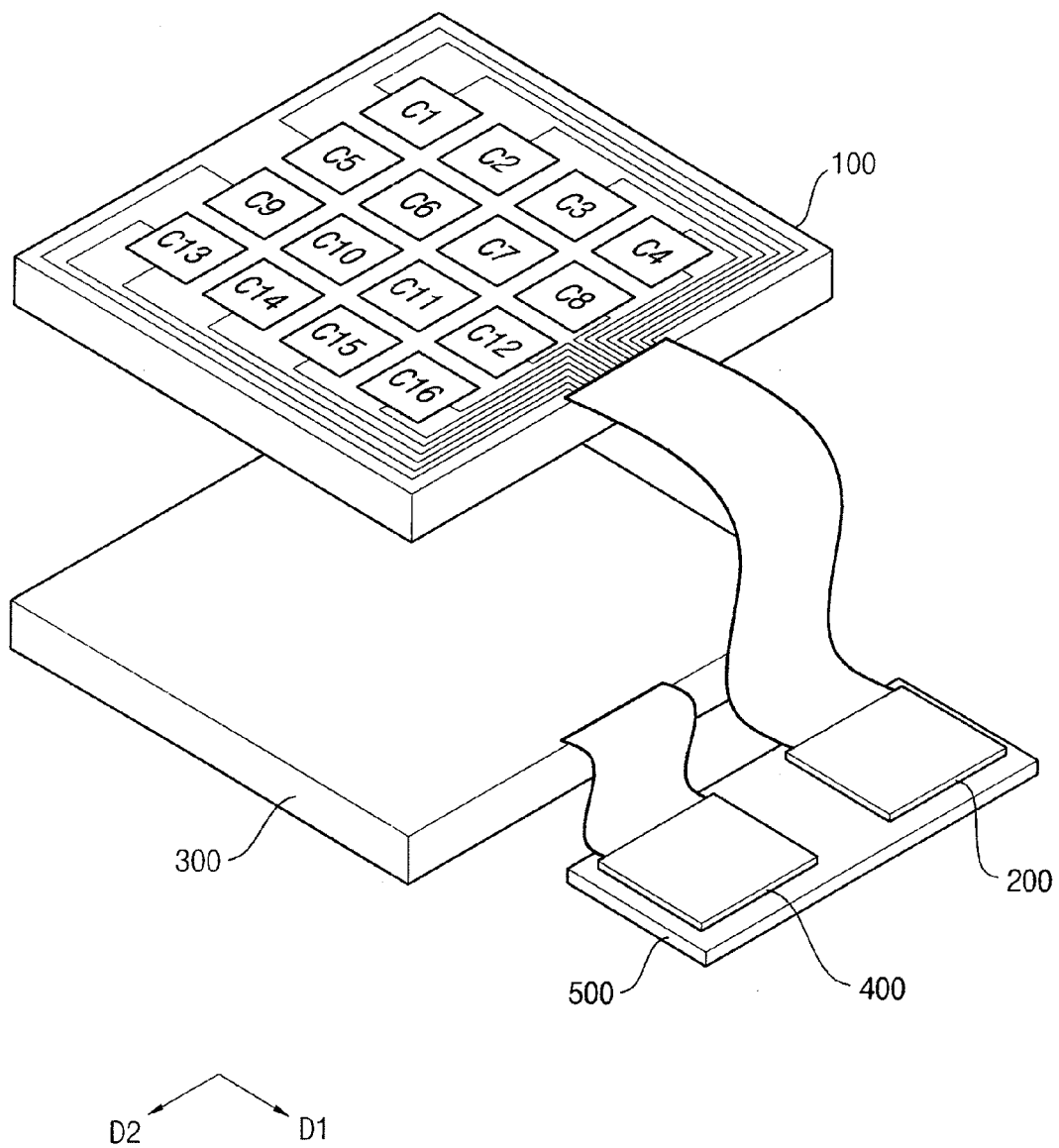
FIG. 1 is a conceptual diagram illustrating a touch display apparatus, according to an exemplary embodiment of the present invention.

Exemplary embodiments of the present invention will be described more fully hereinafter with reference to the accompanying drawings. Like reference numerals refer to like elements throughout the accompanying drawings.

FIG. 1 is a diagram illustrating a touch display apparatus according to an exemplary embodiment of the present invention.

Referring to FIG. 1, the touch display apparatus includes a touch panel 100, a display panel 300 and a panel driver 500.

The touch panel 100 is disposed on the display panel 300.

The display panel 300 may include a third substrate (not shown), a fourth substrate (not shown) and a liquid crystal layer (not shown). The third substrate may include a plurality of pixels. Each pixel may include a switching element and a pixel electrode. The fourth substrate may include a color filter layer. The color filter layer may include a color filter and a common electrode. The liquid crystal layer is disposed between the third and fourth substrates. Voltages are applied to the pixel electrode of the third substrate and the common electrode of the fourth substrate to generate an electric field. An intensity of the electric field is adjusted to change a light transmittance of the liquid crystal layer so that a desired image may be obtained.

The panel driver 500 includes a touch panel driver 200 and a display panel driver 400. The touch panel driver 200 is electrically connected to the touch panel 100, and drives the touch panel 100. The display panel driver 400 is electrically connected to the display panel 300 and drives the display panel 300. The touch panel driver 200 and the display panel driver 400 may be disposed on the same substrate.

The touch panel driver 200 determines a touch coordinate on the touch panel 100, and transmits touch information to the display panel driver 400. The display panel driver 400 drives the display panel 300 based on the touch information.

Although the present exemplary embodiment uses a liquid crystal display (LCD) apparatus, the present invention is not limited thereto. For example, the present invention may use other display apparatuses, such as a plasma panel display (PDP) apparatus, an organic light emitting diode (OLED) apparatus, or a field emission display (FED) apparatus.

Figure 2A:
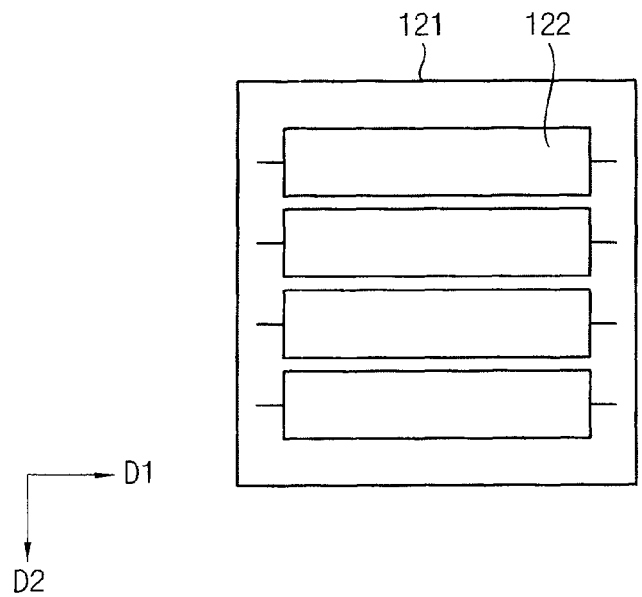
FIG. 2A is a plan view illustrating a first substrate of a touch panel of FIG. 1, according to an exemplary embodiment of the present invention.
Figure 2B:
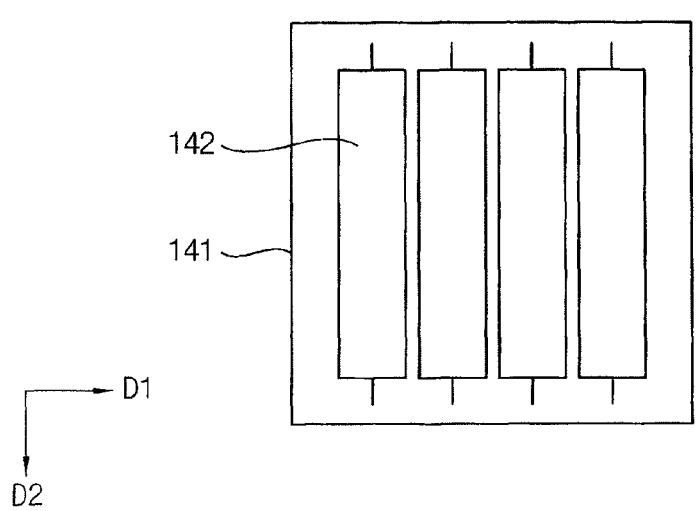
FIG. 2B is a plan view illustrating a second substrate of the touch panel of FIG. 1, according to an exemplary embodiment of the present invention.

FIG. 2A is a plan view illustrating a first substrate of a touch panel of FIG. 1. FIG. 2B is a plan view illustrating a second substrate of the touch panel of FIG. 1.

Referring to FIGS. 1, 2A and 2B, a touch panel assembly includes the touch panel 100 and the touch panel driver 200. The touch panel driver 200 is connected to the touch panel 100 through a plurality of wires and drives the display panel 100.

The touch panel 100 includes the first substrate 120 and the second substrate 140. The second substrate 140 is disposed under the first substrate 120, and overlaps the first substrate 120.

The touch panel 100 may further include a sealing element (not shown) and a spacer (not shown) disposed between the first and second substrates 120 and 140. The sealing element attaches the first substrate 120 to the second substrate 140. The spacer maintains a predetermined distance between the first substrate 120 and the second substrate 140. The spacer may prevent a center portion of the first substrate 120 from sagging, which may occur as the size of the first substrate 120 increases.

Each of the first and second substrates 120 and 140 may have a rectangular shape or a square shape, however, the shape of the first and second substrates 120 and 140 is not limited thereto. The first and second substrates 120 and 140 may have substantially the same area.

The first substrate 120 includes a first base substrate 121 and a plurality of first touch electrodes 122 disposed on the first base substrate 121.

The first base substrate 121 may include a transparent material. The transparent material may be, for example, glass or plastic (e.g., polyethylene terephthalate (PET)), however the transparent material is not limited thereto.

The first touch electrodes 122 extend in a first direction D1, and are disposed in a second direction D2 crossing the first direction D1. The first touch electrodes 122 may be disposed parallel to each other. Each of the first touch electrodes 122 may have a rectangular shape and may have substantially the same size, however the first touch electrodes 122 are not limited thereto.

The first touch electrodes 122 may include a conductive material. The conductive material may be, for example, silver (Ag), indium tin oxide (ITO), indium zinc oxide (IZO), a carbon nanotube (CNT), a conductive polymer, or a combination thereof, however the conductive material is not limited thereto.

A plurality of wires connected to the touch panel driver 200 is disposed at both ends of the first touch electrodes 122.

The second substrate 140 includes a second base substrate 141 and a plurality of second touch electrodes 142 disposed on the second base substrate 141.

The second base substrate 141 may include the transparent material. The transparent material may be, for example, glass or plastic (e.g., polyethylene terephthalate (PET)), however the transparent material is not limited thereto.

The second touch electrodes 142 extend in the second direction D2, and are disposed in the first direction D1. The second touch electrodes 142 may be disposed parallel to each other. Each of the second touch electrodes 142 may have a rectangular shape and may have substantially the same size, however the second touch electrodes 142 are not limited thereto.

The second touch electrodes 142 may include the conductive material. The conductive material may be, for example, silver (Ag), indium tin oxide (ITO), indium zinc oxide (IZO), a carbon nanotube (CNT), a conductive polymer, or a combination thereof, however the conductive material is not limited thereto.

A plurality of wires connected to the touch panel driver 200 is disposed at both ends of the second touch electrodes 142.

A plurality of cells is defined in overlapping areas of the first and second touch electrodes 122 and 142. When four first touch electrodes 122 and four second touch electrodes 142 are formed as shown in FIGS. 1, 2A and 2B, the touch panel 100 includes 16 cells forming a 4×4 matrix. The number of the cells is a multiplication of the number of the first touch electrodes 122 and the number of the second touch electrodes 142.

For example, as shown in FIG. 1, a first cell C1, a second cell C2, a third cell C3, and a fourth cell C4 disposed in the first direction D1 form a first row. A fifth cell C5, a sixth cell C6, a seventh cell C7, and an eighth cell C8 disposed in the first direction D1 form a second row. A ninth cell C9, a tenth cell C10, a eleventh cell C11, and a twelfth cell C12 disposed in the first direction D1 form a third row. A thirteenth cell C13, a fourteenth cell C14, a fifteenth cell C15, and a sixteenth cell C16 disposed in the first direction D1 form a fourth row.

The touch panel 100 may independently identify touches for each cell. In addition, the touch panel 100 may recognize multi-touches in a single cell. Thus, when the touch panel includes 16 cells, the touch panel may identify 32 touches.

Figure 3:
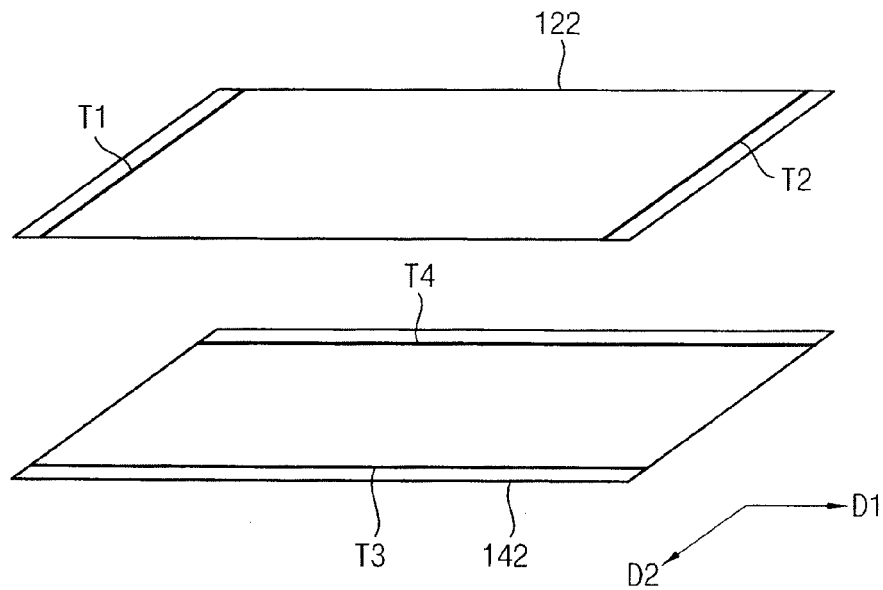
FIG. 3 is a perspective view illustrating a first cell of the touch panel of FIG. 1, according to an exemplary embodiment of the present invention.

FIG. 3 is a perspective view illustrating a first cell of the touch panel of FIG. 1.

Referring to FIGS. 1 to 3, the first cell C1 is defined in an overlapping area of the first touch electrode 122 in the first row on the first base substrate 121, and the second touch electrode 142 in the first column on the second base substrate 141.

As shown in FIG. 3, the first touch electrode 122 includes a first side extending in the second direction D2, and a second side opposing the first side. The first touch electrode 122 includes a first terminal T1 extending in the second direction D2 along the first side, and a second terminal T2 extending in the second direction D2 along the second side.

As shown in FIG. 3, the second touch electrode 142 includes a first side extending in the first direction D1, and a second side opposing the first side. The second touch electrode 142 includes a third terminal T3 extending in the first direction D1 along the first side, and a fourth terminal T4 extending in the first direction D1 along the second side.

The second to sixteenth cells C2 to C16 may have a structure substantially similar to the structure of the first cell C1.

Figure 4:
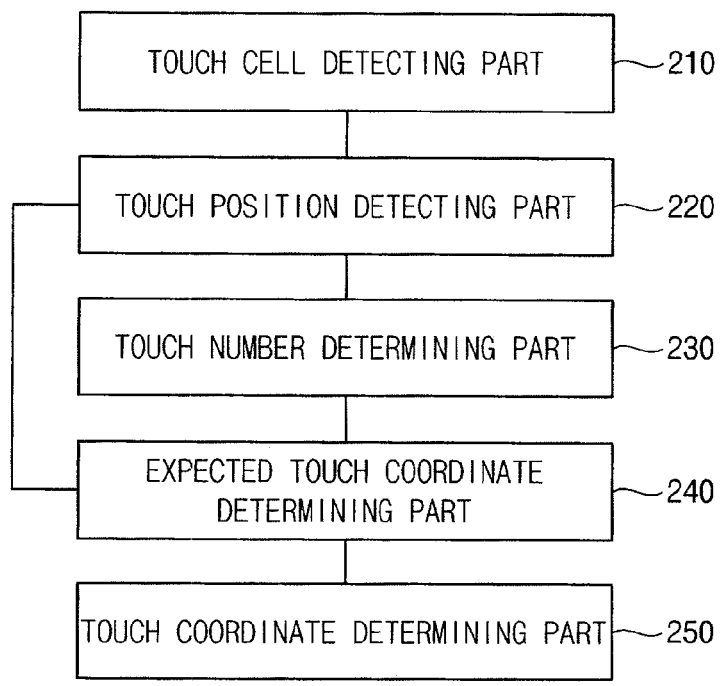
FIG. 4 is a block diagram illustrating the touch panel driver of FIG. 1, according to an exemplary embodiment of the present invention.
Figure 5:
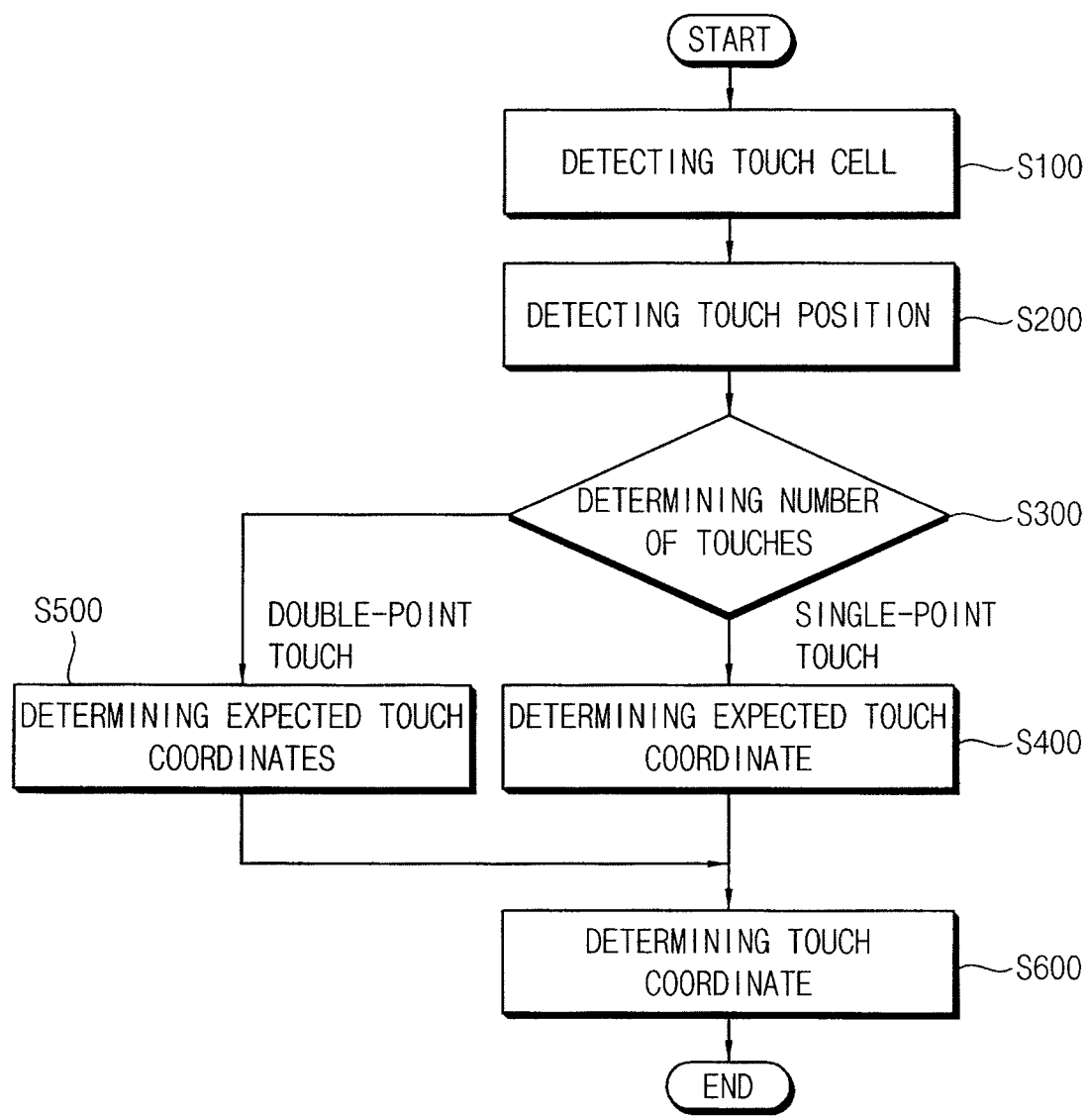
FIG. 5 is a flowchart illustrating a method of determining a touch coordinate of the touch panel assembly of FIG. 1, according to an exemplary embodiment of the present invention.

FIG. 4 is a block diagram illustrating the touch panel driver, of FIG. 1. FIG. 5 is a flowchart illustrating a method of determining a touch coordinate of the touch panel assembly of FIG. 1.

Referring to FIGS. 1, 4 and 5, the touch panel driver 200 includes a touch cell detecting part 210, a touch position detecting part 220, a touch number determining part 230, an expected touch coordinate determining part 240, and a touch coordinate determining part 250.

The touch cell detecting part 210 detects a touch cell that is touched at block S100. When a plurality of touch cells is touched at the same time, the touch cell detecting part 210 may detect the plurality of touch cells.

The touch position detecting part 220 detects a touch position in the touch cell at block S200. The touch position detecting part 220 detects the touch position based on voltages measured at the terminals of the first and second touch electrodes 122 and 142. When two positions are touched at the same time, the touch position detecting part 220 may detect a central point of the two positions.

The touch number determining part 230 determines whether the detected touch is a single-point touch or a double-point touch in the touch cell at block S300. The touch number determining part 230 determines the number of touches based on a distance between the first touch and the second touch.

For example, when the distance between the first touch and the second touch is about 0, the touch number determining part 230 determines the number of touches as a single-point touch. When the distance between the first touch and the second touch is greater than about 0, the touch number determining part 230 determines the number of touches as a double-point touch.

The expected touch coordinate determining part 240 generates expected touch coordinates in correspondence with the number of touches. At block S400, when the touch in the touch cell is detected as a single-point touch, the touch position determined in the touch position detecting part 220 at block S200 is set as the expected touch coordinate by the expected touch coordinate determining part 240. At block S500, when the touch in the touch cell is detected as a double-point touch, the expected touch coordinate determining part 240 determines the expected touch coordinates using the coordinate of the central point between two touches determined by the touch position detecting part 220 at block S200, and the distance between the two touches determined by the touch number determining part 230 at block S300.

At block S600, the touch coordinate determining part 250 determines the touch coordinate from among the expected touch coordinates determined at block S400. When the touch in the touch cell is detected as a single-point touch, the touch coordinate determining part 250 sets the single expected touch coordinate as the touch coordinate. When the touch in the touch cell is detected as a double-point touch, the touch coordinate determining part 250 determines the touch coordinate based on a combined resistance present through the first and second touch electrodes.

Hereinafter, a process of detecting the touch cell at block S100 is explained in more detail.

The touch cell detecting part 210 applies a voltage to the plurality of first touch electrodes 122. The touch cell detecting part 210 then detects a voltage drop resulting from the touch. As a result, the touch cell detecting part 210 may detect which one of the first plurality of touch electrodes 122 includes the cell that was touched (e.g., the touch cell).

The touch cell detecting part 210 applies a voltage to the plurality of second touch electrodes 142. The touch cell detecting part 210 then detects a voltage resulting from the touch. As a result, the touch cell detecting part 210 may detect which one of the second plurality of touch electrodes 142 includes the cell that was touched (e.g., the touch cell).

The touch cell detecting part 210 then detects the touch cell based on the first touch electrode 122 that includes the touch cell and the second touch electrode 142 that includes the touch cell.

For example, assume that the second cell C2 and the eleventh cell C11 are touched at the same time. The touch cell detecting part 210 applies a voltage to the first plurality of touch electrodes 122 (e.g., the first to fourth rows, as shown in FIG. 2A). The touch cell detecting part 210 then detects a voltage drop of the first touch electrode 122 in the first row, and a voltage drop of the first touch electrode 122 in the third row.

The touch cell detecting part 210 then applies a voltage to the second plurality of touch electrodes 142 (e.g., the first to fourth columns, as shown in FIG. 2B). The touch cell detecting part 210 then detects a voltage drop of the second touch electrode 142 in the second column, and a voltage drop of the second touch electrode 142 in the third column.

The touch cell detecting part 210 detects the second cell C2 as a touch cell based on the first touch electrode 122 in the first row and the second touch electrode 142 in the second column, and the eleventh cell C11 as a touch cell based on the first touch electrode 122 in the third row and the second touch electrode 142 in the third column.

Figure 6A:
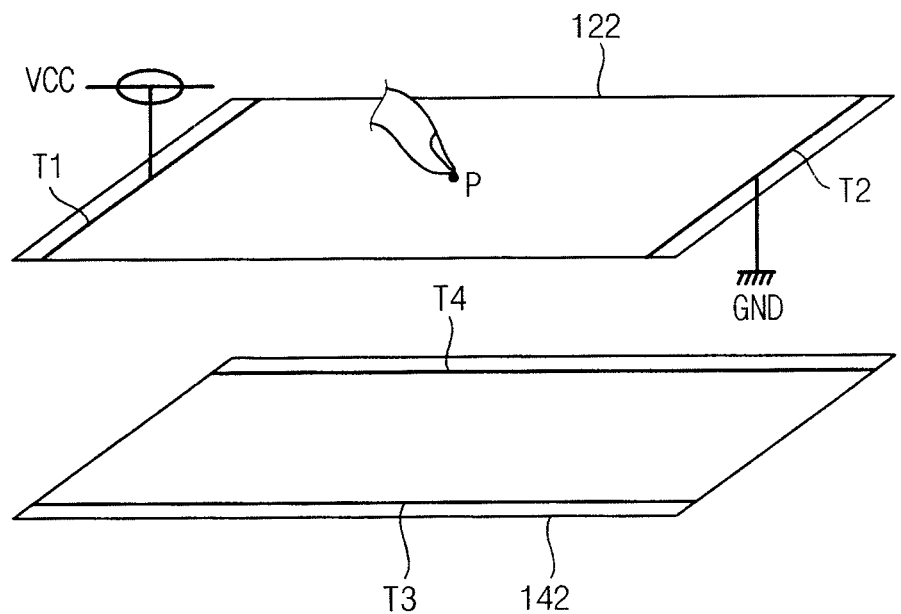
FIGS. 6A and 6B are conceptual diagrams illustrating detecting a touch position of FIG. 5, according to an exemplary embodiment of the present invention.
Figure 6B:
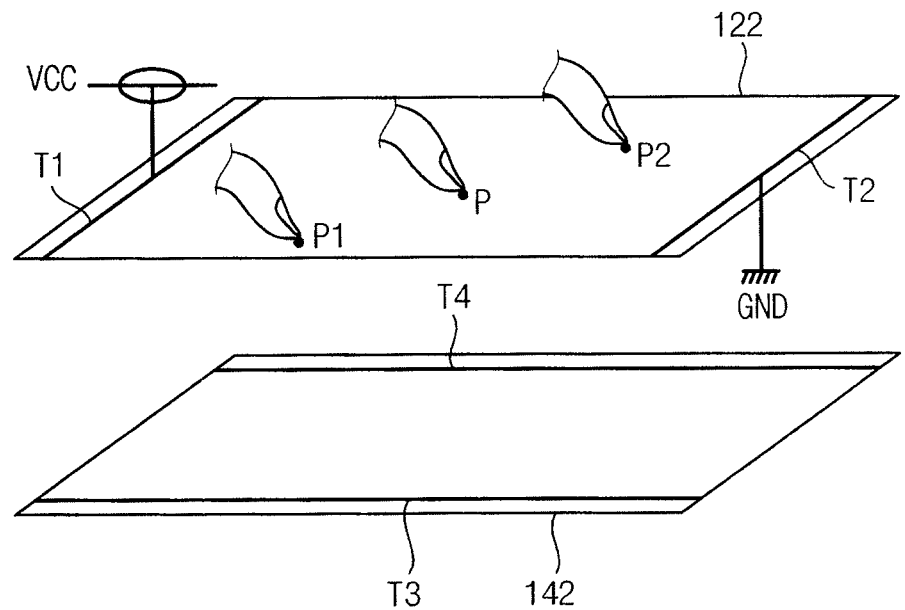

FIGS. 6A and 6B are conceptual diagrams illustrating detecting a touch position of FIG. 5.

Hereinafter, a process of detecting the touch position in the touch cell at block S200 is explained in more detail.

FIG. 6A is a conceptual diagram illustrating detecting a touch position when a single-point touch is detected in the touch cell.

Referring to FIG. 6A, the first touch electrode 122 and the second touch electrode 142 make contact with each other at the single touch position P.

To detect a first coordinate of the touch position P, a source voltage VCC is applied to the first terminal T1 of the first touch electrode 122, and a ground voltage GND is applied to the second terminal T2 of the first touch electrode 122. The voltage of the first touch electrode 122 linearly decreases from the source voltage VCC at the first terminal T1 to the ground voltage GND at the second terminal T2. A first coordinate of the touch position P is obtained based on the voltage at the touch position P. Since the second touch electrode 142 makes contact with the first touch electrode 122 at the touch position P, the second touch electrode 142 has a voltage substantially the same as the voltage at the touch position P of the first touch electrode 122. Thus, the first coordinate of the touch position P may be detected by measuring the voltage of the second touch electrode 142. The voltage of the second touch electrode 142 may be measured at the third terminal T3 or the fourth terminal T4 of the second touch electrode 142.

Alternatively, the source voltage VCC may be applied to the second terminal T2, and the ground voltage GND may be applied to the first terminal T1.

Alternatively, a first voltage may be measured when the source voltage VCC is applied to the first terminal T1 and the ground voltage GND is applied to the second terminal T2, and a second voltage may be measured when the source voltage VCC is applied to the second terminal T2 and the ground voltage GND is applied to the first terminal T1. In this case, the first coordinate of the touch position P may be detected by averaging the first voltage and the second voltage. As a result, the touch position P may be accurately detected.

To detect a second coordinate of the touch position P, the source voltage VCC is applied to the third terminal T3 of the second touch electrode 142, and the ground voltage GND is applied to the fourth terminal T4 of the second touch electrode 142. Since the first touch electrode 122 makes contact with the second touch electrode 142 at the touch position P, the first touch electrode 122 has a voltage substantially the same as the voltage at the touch position P of the second touch electrode 142. Thus, the second coordinate of the touch position P may be detected by measuring the voltage of the first touch electrode 122. The voltage of the first touch electrode 122 may be measured at the first terminal T1 or the second terminal T2 of the first touch electrode 122.

Alternatively, the source voltage VCC may be applied to the fourth terminal T4, and the ground voltage GND may be applied to the third terminal T3.

Alternatively, a third voltage may be measured when the source voltage VCC is applied to the third terminal T3 and the ground voltage GND is applied to the fourth terminal T4, and a fourth voltage may be measured when the source voltage VCC is applied to the fourth terminal T4 and the ground voltage GND is applied to the third terminal T3. In this case, the second coordinate of the touch position P may be detected by averaging the third voltage and the fourth voltage. As a result, the touch position P may be accurately detected.

Figure 7:
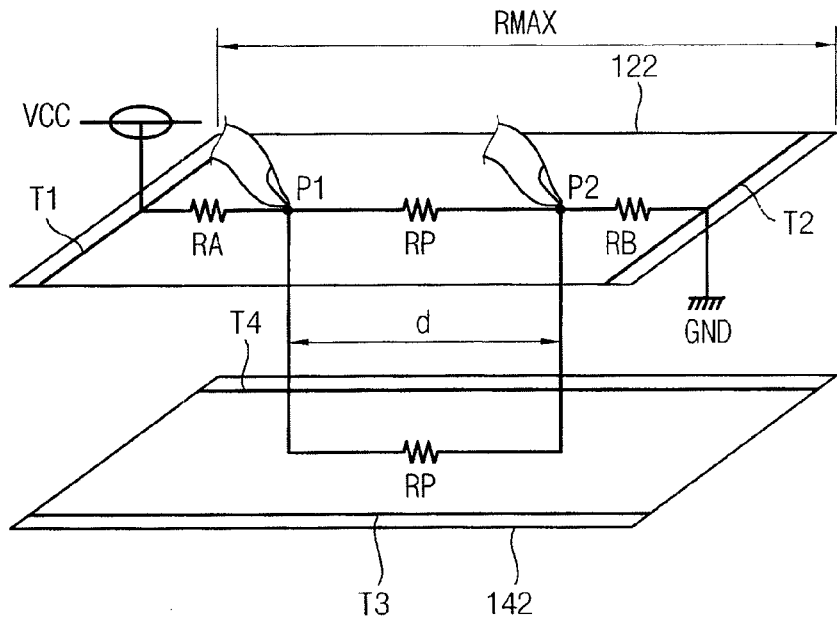
FIG. 7 is a conceptual diagram illustrating determining a double-point touch of FIG. 5, according to an exemplary embodiment of the present invention.
Figure 8:
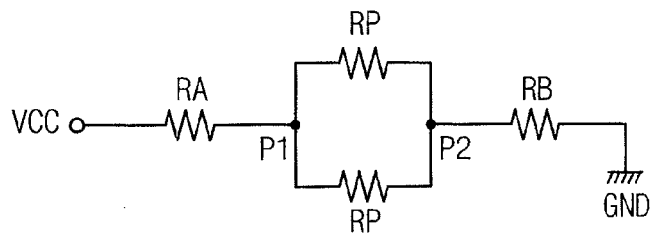
FIG. 8 is a circuit diagram illustrating a resistance of FIG. 7, according to an exemplary embodiment of the present invention.
Figure 9:
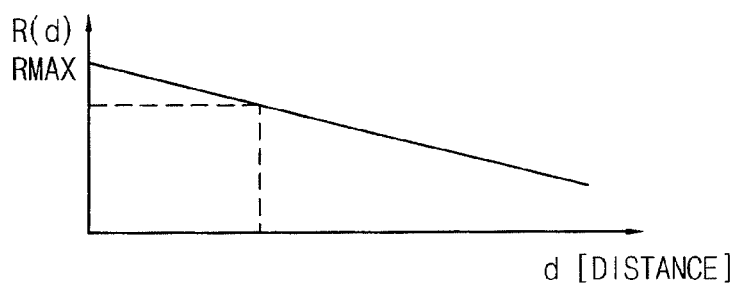
FIG. 9 is a graph illustrating a resistance according to a distance between a first touch and a second touch of FIG. 5, according to an exemplary embodiment of the present invention.

FIG. 7 is a conceptual diagram illustrating determining a double-point touch of FIG. 5. FIG. 8 is a circuit diagram illustrating a resistance of FIG. 7. FIG. 9 is a graph illustrating a resistance according to a distance between a first touch and a second touch of FIG. 5.

Hereinafter, referring to FIGS. 7 to 9, a process of determining whether the touch at the touch cell is a single-point touch or a double-point touch at block S300 is explained in more detail.

A first distance dx is determined based on a resistance of the first touch electrode 122. The source voltage VCC is applied to the first terminal T1 of the first touch electrode 122, and the ground voltage GND is applied to the second terminal T2 of the first touch electrode 122.

A resistance RA is located on the first touch electrode 122, and represents a resistance between the first terminal T1 and a first touch position P1. A resistance RP is located on the first and second touch electrodes 122 and 142, and represents a resistance between the first touch position P1 and a second touch position P2. A resistance RB is disposed on the first touch electrode 122, and represents a resistance between the second touch position P2 and the second terminal T2.

The combined resistance between the first terminal T1 and the second terminal T2 is RA+RP//RP+RB, which is simplified as RA+RP/2+RB. As the distance between the first and second touch positions P1 and P2 increases, the combined resistance decreases due to the parallel connection of the resistance RP.

Figure 11:
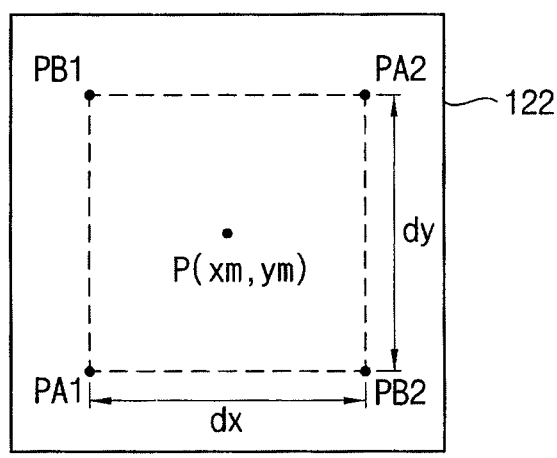
FIG. 11 is a conceptual diagram illustrating the expected touch coordinates of FIG. 10, according to an exemplary embodiment of the present invention.

A serial resistance between the first terminal T1 and the second terminal T2 is a resistance RMAX. As shown in FIGS. 7 and 11, the first distance dx between the first and second touch positions P1 and P2 may be determined by measuring the combined resistance between the first and second terminals T1 and T2.

Alternatively, the source voltage VCC may be applied to the second terminal T2, and the ground voltage GND may be applied to the first terminal T1.

In a similar manner, a second distance dy is determined based on a resistance of the second touch electrode 142. The source voltage VCC is applied to the third terminal T3 of the second touch electrode 142, and the ground voltage GND is applied to the fourth terminal T4 of the second touch electrode 142.

Alternatively, the source voltage VCC may be applied to the fourth terminal T4, and the ground voltage GND may be applied to the third terminal T3.

A distance d between the first touch position P1 and the second touch position P2 may be determined using the first distance dx and the second distance dy. For example, when the first distance dx and the second distance dy are about 0, the distance d between the first touch position P1 and the second touch position P2 is about 0.

The touch number determining part 230 determines that a single-point touch has occurred when the distance d between the first and second touch positions P1 and P2 is about 0, and that a double-point touch has occurred when the distance d between the first and second touch positions P1 and P2 is greater than about 0.

Figure 10:
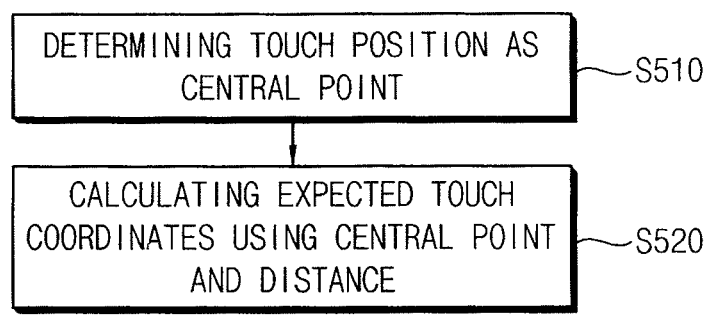
FIG. 10 is a flowchart illustrating generating expected touch coordinates of FIG. 5 when two touches exist in a touch cell, according to an exemplary embodiment of the present invention.

FIG. 10 is a flowchart illustrating generating expected touch coordinates of FIG. 5 when two touches exist in a touch cell.

Referring to FIG. 10, when the expected touch coordinates are generated for a double-point touch at block S500 (see FIG. 5), the coordinate of the touch position P is set as the central point of the first and second touches P1 and P2 at block S510. The expected touch coordinates are calculated using the coordinate of the central point P and the distance d between the first touch P1 and the second touch P2 at block S520.

FIG. 11 is a conceptual diagram illustrating the expected touch coordinates of FIG. 10.

Referring to FIG. 11, when calculating the expected touch coordinates at block S520, the expected touch coordinates are obtained using the coordinate of the central point P between the first and second touches P1 and P2, and the distance d between the first and second touches P1 and P2.

The first distance dx is added to a first coordinate xm of the central point, or is subtracted from the first coordinate xm of the central point so that an x-axis value of the expected touch coordinate may be obtained. The second distance dy is added to a second coordinate ym of the central point, or is subtracted from the second coordinate ym of the central point so that a y-axis value of the expected touch coordinate may be obtained.

When two touches exist in a touch cell, two expected touch coordinates are generated. A first expected touch coordinate (PA1, PA2) includes a coordinate of PA1=(xm−dx/2, ym−dy/2) as the first touch, and a coordinate of PA2=(xm+dx/2, ym+dy/2) as the second touch. A second expected touch coordinate (PB1, PB2) includes a coordinate of PB1=(xm−dx/2, ym+dy/2) as the first touch, and a coordinate of PB2=(xm+dx/2, ym−dy/2) as the second touch.

Figure 12A:
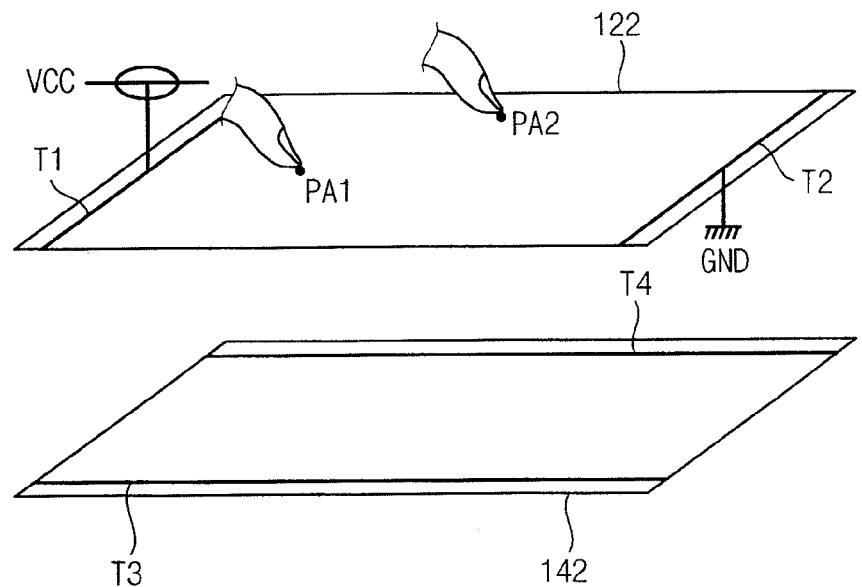
FIGS. 12A and 12B are conceptual diagrams illustrating determining the touch coordinate of FIG. 5, according to an exemplary embodiment of the present invention.
Figure 12B:
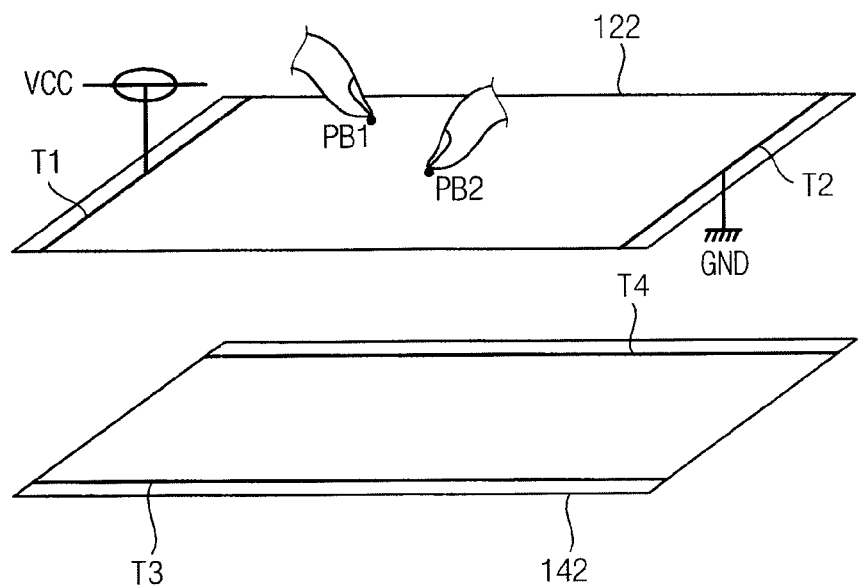

FIGS. 12A and 12B are conceptual diagrams illustrating determining the touch coordinate of FIG. 5.

FIG. 12A is a conceptual diagram illustrating a situation where the first expected touch coordinate is assumed as an actual touch coordinate. Herein, the first expected touch coordinate has two coordinates disposed in a positive inclination when the third terminal T3 of the second touch electrode 142 is assumed as an x-axis, and the first terminal T1 of the first touch electrode 122 is assumed as a y-axis.

Referring to FIG. 12A, the source voltage VCC is applied to the first terminal T1 of the first touch electrode 122, and the ground voltage GND is applied to the second terminal T2 of the first touch electrode 122.

A first voltage is measured at the third terminal T3 of the second touch electrode 142, and a second voltage is measured at the fourth terminal T4 of the second touch electrode 142.

When the first touch coordinate is the actual touch coordinate, the second voltage may be lower than the first voltage. Thus, subtracting the first voltage from the second voltage results in a negative value.

FIG. 12B is a conceptual diagram illustrating a situation where the second expected touch coordinate is assumed as the actual touch coordinate. Herein, the second expected touch coordinate has two coordinates disposed in a negative inclination when the third terminal T3 of the second touch electrode 142 is assumed as the x-axis, and the first terminal T1 of the first touch electrode 122 is assumed as the y-axis.

Referring to FIG. 12B, the source voltage VCC is applied to the first terminal T1 of the first touch electrode 122, and the ground voltage GND is applied to the second terminal T2 of the first touch electrode 122.

A first voltage is measured at the third terminal T3 of the second touch electrode 142, and a second voltage is measured at the fourth terminal T4 of the second touch electrode 142.

When the second touch coordinate is the actual touch coordinate, the second voltage may be greater than the first voltage. Thus, subtracting the first voltage from the second voltage results in a positive value.

For example, when the first voltage is greater than the second voltage, the first expected touch coordinate may be determined as the actual touch coordinate. When the second voltage is greater than the first voltage, the second expected touch coordinate may be determined as the actual coordinate.

According to the present exemplary embodiment, the first substrate 120 of the touch panel 100 includes four first touch electrodes 122, and the second substrate 140 of the touch panel 100 includes four second touch electrodes 142. As a result, the width of the bezel of the touch display apparatus may be decreased. Since two touches may be detected in a single cell, a total of 32 touches may be detected. The touch coordinates may be accurately determined using the expected touch coordinates.

Figure 13:
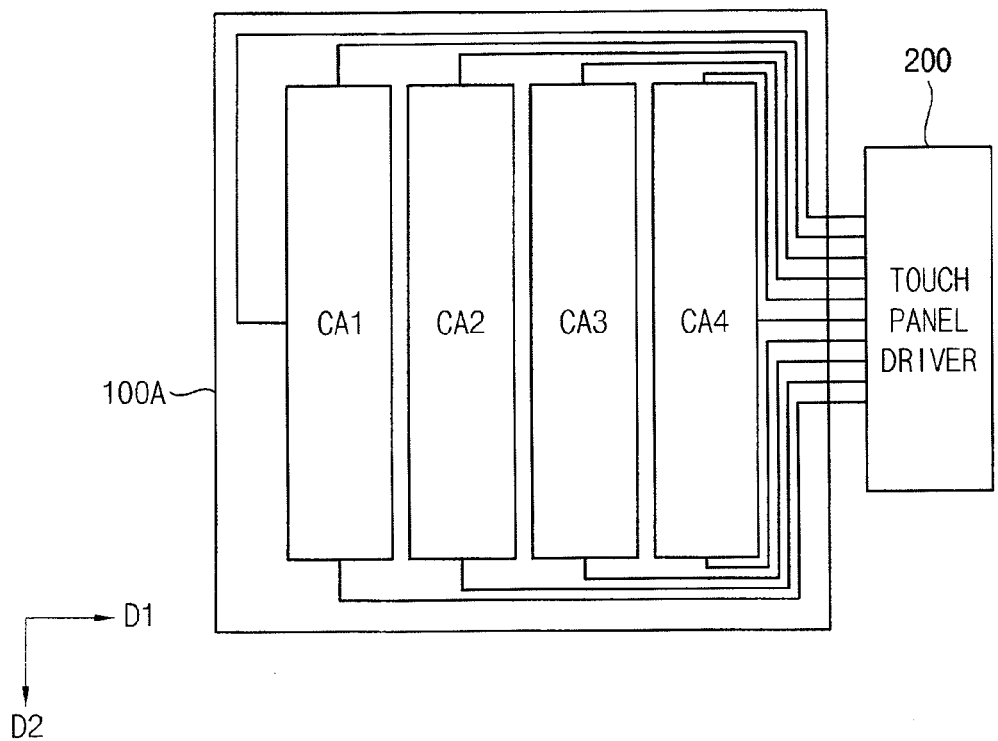
FIG. 13 is a conceptual diagram illustrating a touch panel assembly, according to an exemplary embodiment of the present invention.
Figure 14:
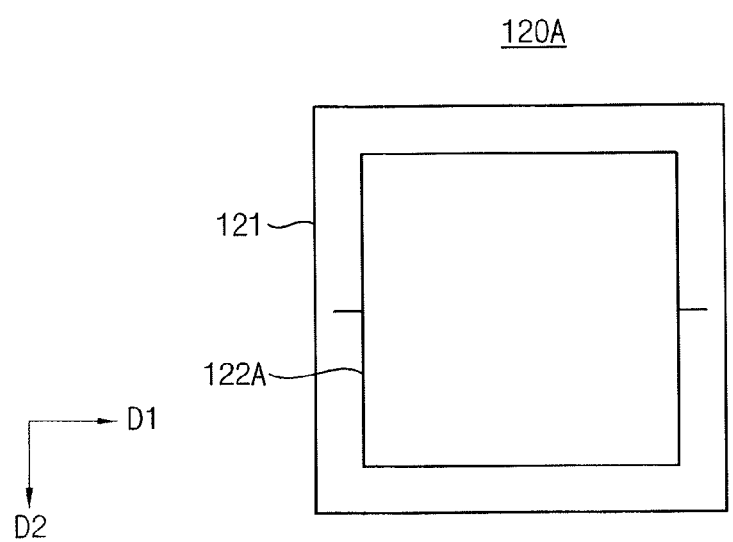
FIG. 14 is a plan view illustrating a first substrate of a touch panel of FIG. 13, according to an exemplary embodiment of the present invention.

FIG. 13 is a conceptual diagram illustrating a touch panel assembly according to an exemplary embodiment of the present invention. FIG. 14 is a plan view illustrating a first substrate of a touch panel of FIG. 13.

The touch panel assembly according to the present exemplary embodiment is substantially the same as the touch panel assembly according to the exemplary embodiment of FIG. 1, except that a first substrate 120A includes a single first touch electrode 122A. Thus, the same reference numerals will be used to refer to the same or like elements as those described in the previous exemplary embodiments, and any repetitive explanation concerning the above elements will be omitted.

Referring to FIGS. 13 and 14, the touch panel assembly includes a touch panel 100A and a touch panel driver 200. The touch panel driver 200 is connected to the touch panel 100A through a plurality of wires and drives the display panel 300.

The touch panel 100A includes the first substrate 120A and the second substrate 140. The second substrate 140 is disposed under the first substrate 120A, and overlaps the first substrate 120A.

The first substrate 120A includes a first base substrate 121, and the single first touch electrode 122A is disposed on the first base substrate 121.

The first touch electrode 122A may include a conductive material. The conductive material may be, for example, silver (Ag), indium tin oxide (ITO), indium zinc oxide (IZO), a carbon nanotube (CNT), a conductive polymer, or a combination thereof, however the conductive material is not limited thereto.

A plurality of cells is defined in overlapping areas of the first and second touch electrodes 122A and 142. When the single first touch electrode 122A and four second touch electrodes 142 are formed as shown in FIGS. 13 and 14, the touch panel 100A includes 4 cells.

Each cell has substantially the same shape as the second touch electrodes 142.

For example, as shown in FIG. 13, the cells extend in a second direction D2, and are disposed in a first direction D1. A first cell CA1, a second cell CA2, a third cell CA3 and a fourth cell CA4 are sequentially disposed in the first direction D1.

Figure 15:
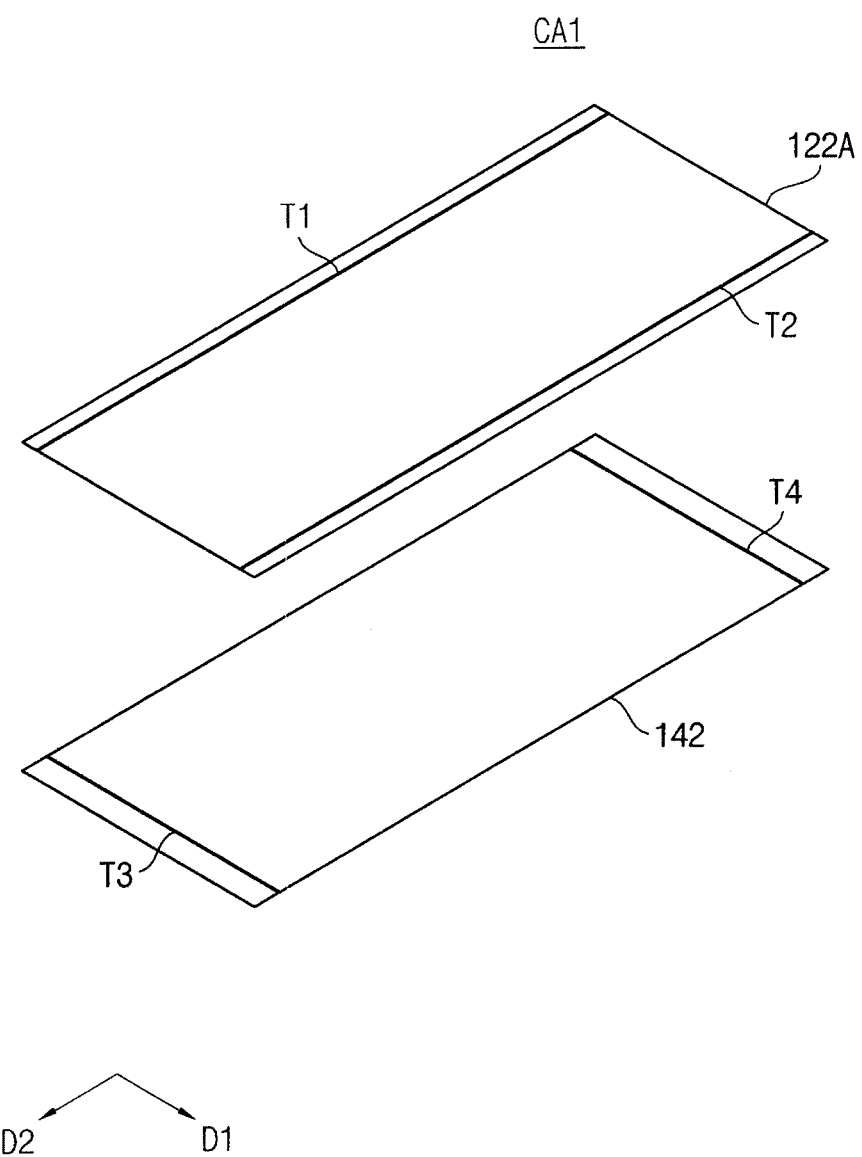
FIG. 15 is a perspective view illustrating a first cell of the touch panel of FIG. 13, according to an exemplary embodiment of the present invention.

FIG. 15 is a perspective view illustrating a first cell of the touch panel of FIG. 13.

Referring to FIGS. 13 to 15, the first cell CA1 is defined in an overlapping area of the first touch electrode 122A and the second touch electrode 142 in a first column. In the present exemplary embodiment, the first cell CA1 may have a rectangular shape having a longitudinal direction substantially parallel to the second direction D2, however the shape of the first cell CA1 is not limited thereto.

As shown in FIG. 15, the first touch electrode 122A includes a first side extending in the second direction D2 and a second side opposing the first side. The first touch electrode 122A includes a first terminal T1 extending in the second direction D2 along the first side, and a second terminal T2 extending in the second direction D2 along the second side.

The second touch electrode 142 includes a first side extending in the first direction D1 and a second side opposing the first side. The second touch electrode 142 includes a third terminal T3 extending in the first direction D1 along the first side, and a fourth terminal T4 extending in the first direction D1 along the second side.

The second to fourth cells CA2 to CA4 may have a structure substantially similar to the first cell CA1.

According to the present exemplary embodiment, the first substrate 120A includes the single first touch electrode 122A, and the second substrate 140 includes four second touch electrodes 142. As a result, the width of the bezel in the first direction D1 may be further decreased compared to the touch panel assembly according to the exemplary embodiment of FIG. 1. Since two touches may be detected in a single cell, a total of 8 touches may be detected. The touch coordinates may be accurately determined using the expected touch coordinates.

Figure 16:
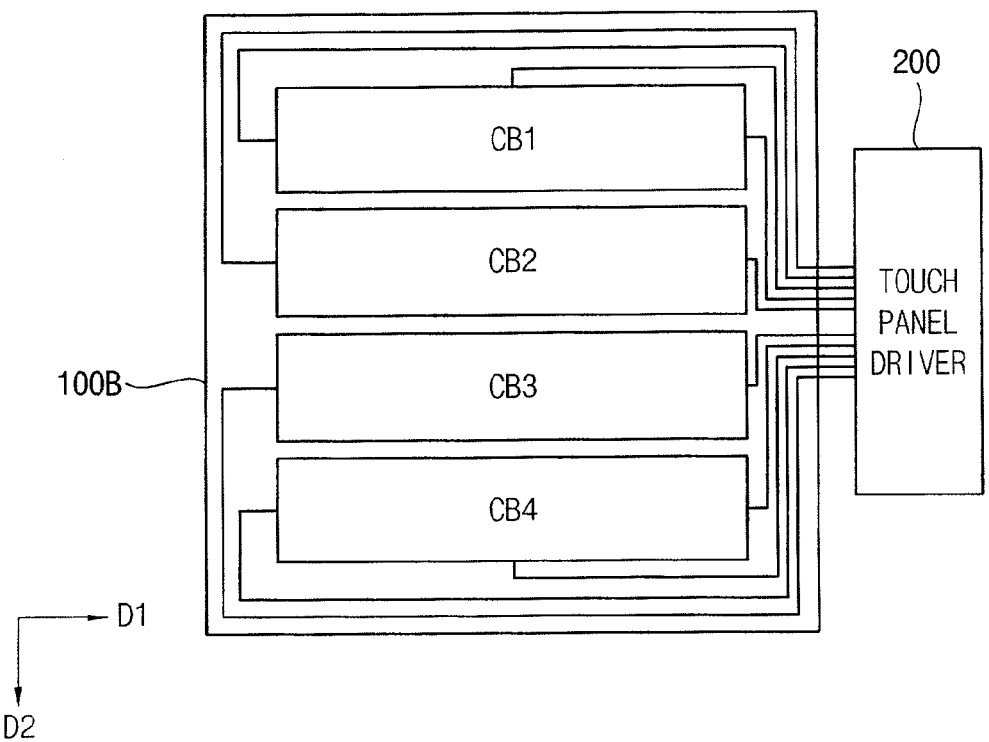
FIG. 16 is a conceptual diagram illustrating a touch panel assembly, according to an exemplary embodiment of the present invention.
Figure 17:
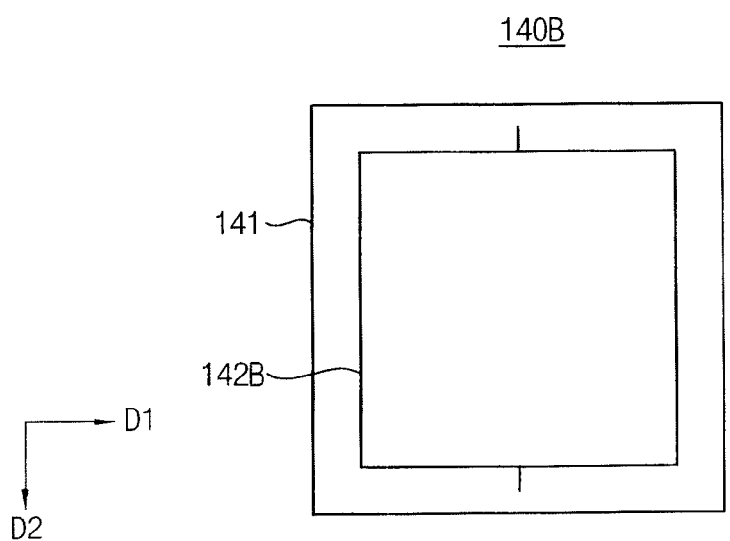
FIG. 17 is a plan view illustrating a second substrate of a touch panel of FIG. 16, according to an exemplary embodiment of the present invention.

FIG. 16 is a conceptual diagram illustrating a touch panel assembly according to an exemplary embodiment of the present invention. FIG. 17 is a plan view illustrating a second substrate of a touch panel of FIG. 16.

The touch panel assembly according to the present exemplary embodiment is substantially the same as the touch panel assembly according to the exemplary embodiment of FIG. 1, except that a second substrate 140B includes a single second touch electrode 142B. Thus, the same reference numerals will be used to refer to the same or like elements as those described in the previous exemplary embodiments, and any repetitive explanation concerning the above elements will be omitted.

Referring to FIGS. 16 and 17, the touch panel assembly includes a touch panel 100B and a touch panel driver 200. The touch panel driver 200 is connected to the touch panel 100B through a plurality of wires and drives the display panel 300.

The touch panel 100B includes the first substrate 120 and the second substrate 140B. The second substrate 140B is disposed under the first substrate 120, and overlaps the first substrate 120.

The second substrate 140B includes a second base substrate 141, and the single second touch electrode 142B is disposed on the second base substrate 141.

The second touch electrodes 142B may include a conductive material. The conductive material may be, for example, silver (Ag), indium tin oxide (ITO), indium zinc oxide (IZO), a carbon nanotube (CNT), a conductive polymer, or a combination thereof, however the conductive material is not limited thereto.

A plurality of cells is defined in overlapping areas of the first and second touch electrodes 122 and 142B. When four first touch electrodes 122 and the single second touch electrode 142B are formed as shown in FIGS. 16 and 17, the touch panel 100B includes 4 cells. Each cell has substantially the same shape as the first touch electrodes 122.

For example, as shown in FIG. 16, the cells extend in a first direction D1, and are disposed in a second direction D2. A first cell CB1, a second cell CB2, a third cell CB3 and a fourth cell CB4 are sequentially disposed in the second direction D2.

Figure 18:
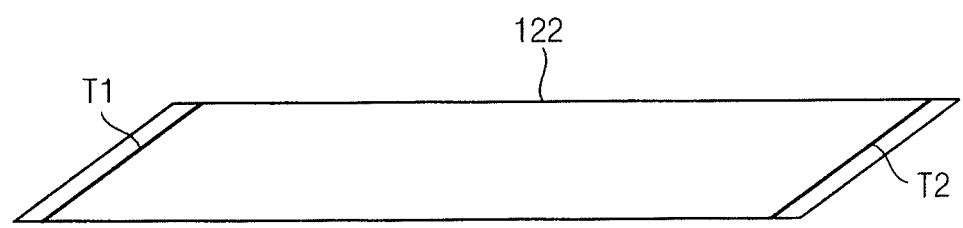
FIG. 18 is a perspective view illustrating a first cell of the touch panel of FIG. 16, according to an exemplary embodiment of the present invention.
Figure 18:
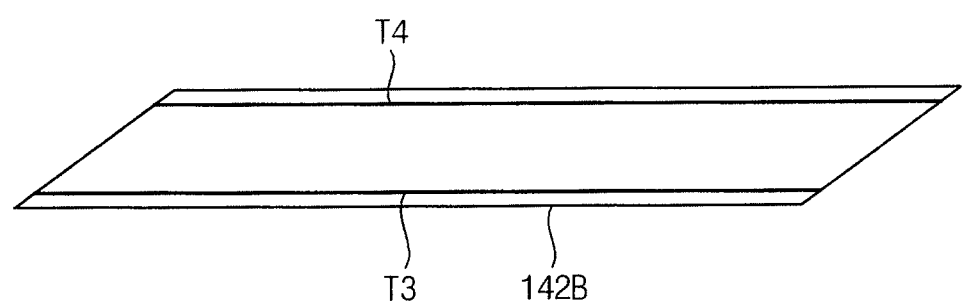
Figure 18:

FIG. 18 is a perspective view illustrating a first cell of the touch panel of FIG. 16.

Referring to FIGS. 16 to 18, the first cell CB1 is defined in an overlapping area of the first touch electrode 122 in a first row, and the second touch electrode 142B. In the present exemplary embodiment, the first cell CB1 may have a rectangular shape having a longitudinal direction substantially parallel to the first direction D1, however the shape of the first cell CB1 is not limited thereto.

As shown in FIG. 18, the first touch electrode 122 includes a first side extending in the second direction D2 and a second side opposing the first side. The first touch electrode 122 includes a first terminal T1 extending in the second direction D2 along the first side, and a second terminal T2 extending in the second direction D2 along the second side.

The second touch electrode 142B includes a first side extending in the first direction D1 and a second side opposing the first side. The second touch electrode 142B includes a third terminal T3 extending in the first direction D1 along the first side, and a fourth terminal T4 extending in the first direction D1 along the second side.

The second to fourth cells CB2 to CB4 may have a structure substantially similar to the first cell CB1.

According to the present exemplary embodiment, the first substrate 120 includes four first touch electrodes 122, and the second substrate 140B includes the single second touch electrode 142B. As a result, the width of the bezel in the second direction D2 may be further decreased compared to the touch panel assembly according to the exemplary embodiment of FIG. 1. Since two touches may be detected in a single cell, a total of 8 touches may be detected. The touch coordinates may be accurately determined using the expected touch coordinates.

Figure 19:
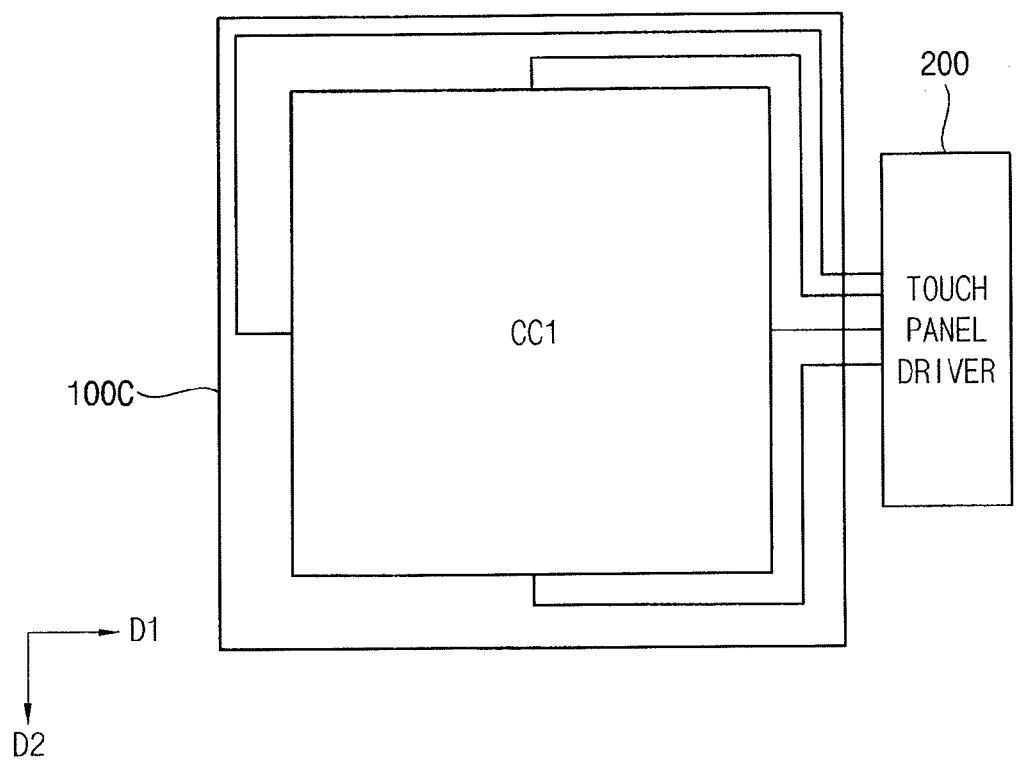
FIG. 19 is a conceptual diagram illustrating a touch panel assembly, according to an exemplary embodiment of the present invention.
Figure 20:
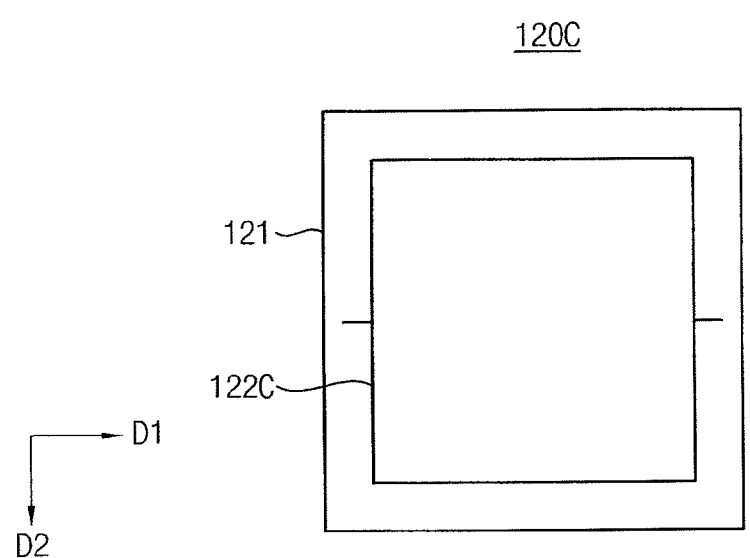
FIG. 20 is a plan view illustrating a first substrate of a touch panel of FIG. 19, according to an exemplary embodiment of the present invention.
Figure 21:
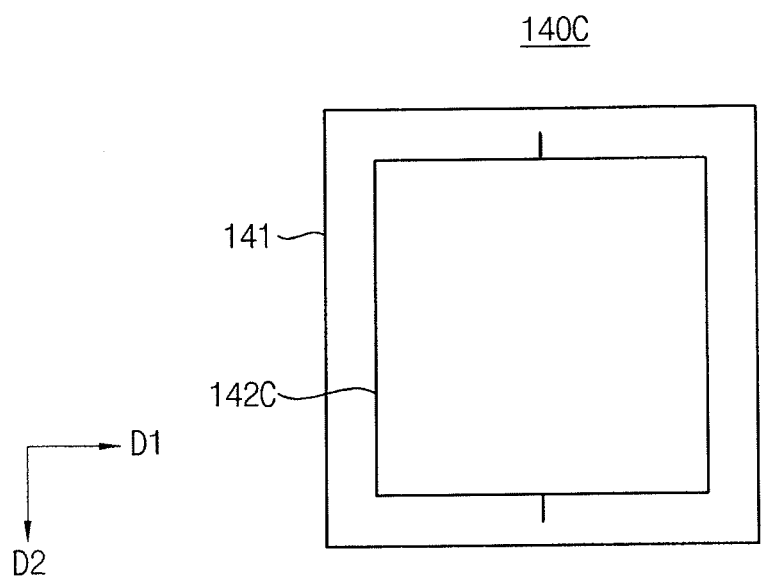
FIG. 21 is a plan view illustrating a second substrate of the touch panel of FIG. 19, according to an exemplary embodiment of the present invention.

FIG. 19 is a conceptual diagram illustrating a touch panel assembly according to an exemplary embodiment of the present invention. FIG. 20 is a plan view illustrating a first substrate of a touch panel of FIG. 19. FIG. 21 is a plan view illustrating a second substrate of the touch panel of FIG. 19.

The touch panel assembly according to the present exemplary embodiment is substantially the same as the touch panel assembly according to the exemplary embodiment of FIG. 1, except that a first substrate 120C includes a single first touch electrode 122C, and a second substrate 140C includes a single second touch electrode 142C. Thus, the same reference numerals will be used to refer to the same or like elements as those described in the previous exemplary embodiments, and any repetitive explanation concerning the above elements will be omitted.

Referring to FIGS. 19 to 21, the touch panel assembly includes a touch panel 100C and a touch panel driver 200. The touch panel driver 200 is connected to the touch panel 100C through a plurality of wires and drives the display panel 300.

The touch panel 100C includes the first substrate 120C and the second substrate 140C. The second substrate 140C is disposed under the first substrate 120C, and overlaps the first substrate 120C.

The first substrate 120C includes a first base substrate 121, and the single first touch electrode 122C disposed on the first base substrate 121.

The second substrate 140C includes a second base substrate 141, and the single second touch electrode 142C disposed on the second base substrate 141.

The first and second touch electrodes 122C and 142C may include a conductive material. The conductive material may be, for example, silver (Ag), indium tin oxide (ITO), indium zinc oxide (IZO), a carbon nanotube (CNT), a conductive polymer, or a combination thereof, however the conductive material is not limited thereto.

A single cell CC1 is defined in overlapping areas of the first and second touch electrodes 122C and 142C.

Figure 22:
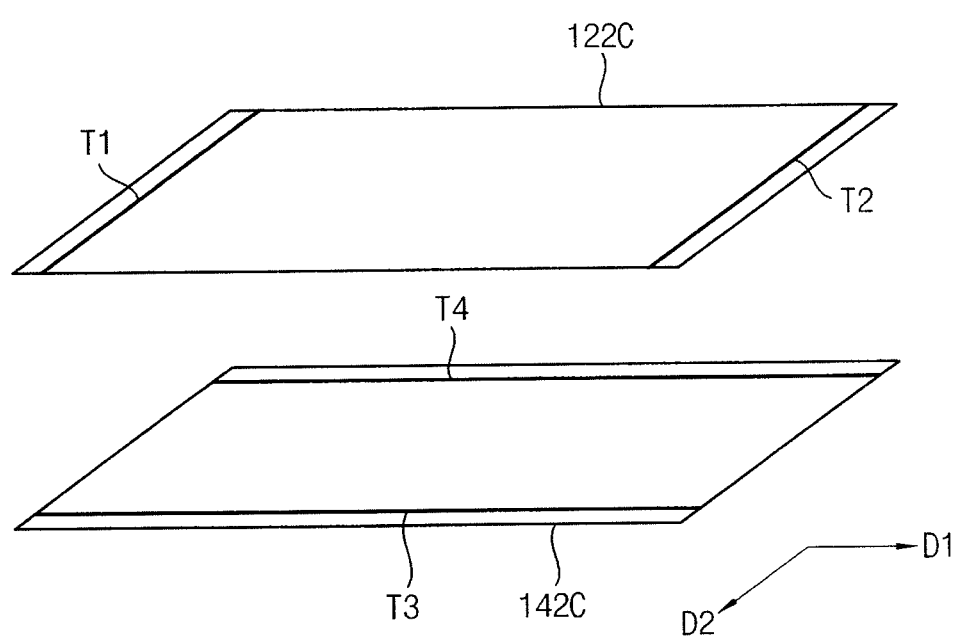
FIG. 22 is a perspective view illustrating a first cell of the touch panel of FIG. 19, according to an exemplary embodiment of the present invention.

FIG. 22 is a perspective view illustrating a first cell of the touch panel of FIG. 19.

Referring to FIGS. 19 to 22, the first cell CC1 is defined in an overlapping area of the single first touch electrode 122C and the single second touch electrode 142C. In the present exemplary embodiment, the first cell CC1 may have a square shape, however the shape of the first cell CC1 is not limited thereto.

As shown in FIG. 22, the first touch electrode 122C includes a first side extending in the second direction D2 and a second side opposing the first side. The first touch electrode 122C includes a first terminal T1 extending in the second direction D2 along the first side, and a second terminal T2 extending in the second direction D2 along the second side.

The second touch electrode 142C includes a first side extending in the first direction D1 and a second side opposing the first side. The second touch electrode 142C includes a third terminal T3 extending in the first direction D1 along the first side, and a fourth terminal T4 extending in the first direction D1 along the second side.

According to the present exemplary embodiment, the first substrate 120C includes the single first touch electrode 122C, and the second substrate 140C includes the single second touch electrode 142C. As a result, the width of the bezel in the first direction D1 and the second direction D2 may be further decreased compared to the touch panel assembly according to the exemplary embodiment of FIG. 1. Two touches may be detected, and the touch coordinates may be accurately determined using the expected touch coordinates.

According to the exemplary embodiments of the present invention as explained above, the width of the bezel may be decreased, and the touch coordinates of multi-touches may be accurately determined.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A method of determining a touch coordinate in a touch panel, comprising:
   detecting a touch cell among a plurality of touch cells, wherein the plurality of touch cells are defined by a plurality of areas in the touch panel in which a first touch electrode and a second touch electrode overlap with each other;
   detecting a touch position in the detected touch cell based on a first electrical signal measured at at least one of a plurality of terminals of the first and second touch electrodes;
   determining a number of touches based on a distance between a first touch and a second touch;
   determining expected touch coordinates, wherein the expected touch coordinates correspond to the touch position when the number of touches is one, and the expected touch coordinates are based on a central point between the first and second touches and the distance between the first and second touches when the number of touches is two; and
   determining the touch coordinate from among the expected touch coordinates based on a voltage measured at at least one of the plurality of terminals of the first and second touch electrodes,
   wherein the touch panel comprises a first substrate and a second substrate overlapping the first substrate, the first substrate comprises at least one first touch electrode, and the second substrate comprises at least one second touch electrode,
   wherein the first touch electrode comprises a first terminal extending along a first side of the first touch electrode in a first direction, and a second terminal extending along a second side of the first touch electrode in the first direction, wherein the first and second sides of the first touch electrode oppose each other, and
   the second touch electrode comprises a third terminal extending along a first side of the second touch electrode in a second direction crossing the first direction, and a fourth terminal extending along a second side of the second touch electrode in the second direction, wherein the first and second sides of the second touch electrode oppose each other,
   wherein determining the touch coordinate from among the expected touch coordinates comprises applying a source voltage to the first terminal and a ground voltage to the second terminal, and measuring a first voltage at the third terminal and a second voltage at the fourth terminal while the source voltage is applied to the first terminal and the ground voltage is applied to the second terminal, wherein determining the touch coordinate further comprises calculating a single difference between the first and second voltages while the source voltage is applied to the first terminal and the ground voltage is applied to the second terminal, in response to determining that the number of touches is two, and wherein a first expected touch coordinate is determined as the touch coordinate when the first voltage is greater than the second voltage and a second expected touch coordinate is determined as the touch coordinate when the second voltage is greater than the first voltage.

2. The method of claim 1, wherein the first electrical signal is a voltage.

3. The method of claim 2, wherein detecting the touch position in the detected touch cell comprises:
applying the source voltage to the first terminal and the ground voltage to the second terminal, and determining a first coordinate based on a voltage measured at the third terminal; and
applying the source voltage to the third terminal and the ground voltage to the fourth terminal, and determining a second coordinate based on a voltage measured at the first terminal.

4. The method of claim 1, wherein determining the number of touches comprises:
setting the number of touches to one upon determining that the distance between the first and second touches is about 0; and
setting the number of touches to two upon determining that the distance between the first and second touches is greater than about 0.

5. The method of claim 1, wherein determining the number of touches comprises:
determining a first distance in the first direction based on a resistance of the first touch electrode; and
determining a second distance in the second direction based on a resistance of the second touch electrode.

6. The method of claim 5, wherein the first distance is determined by applying the source voltage to the first terminal and the ground voltage to the second terminal, and the second distance is determined by applying the source voltage to the third terminal and the ground voltage to the fourth terminal.

7. The method of claim 1, wherein determining the expected touch coordinates comprises:
setting the touch position as the central point between the first and second touches upon determining that the number of touches is two; and
calculating the expected touch coordinates using the central point and the distance between the first and second touches.

8. The method of claim 7, wherein the expected touch coordinates comprise:
the first expected touch coordinate of $\{P1=(xm-dx/2, ym-dy/2), P2=(xm+dx/2, ym+dy/2)\}$; and
the second expected touch coordinate of $\{P1=(xm-dx/2, ym+dy/2), P2=(xm+dx/2, ym-dy/2)\}$,
wherein P1 is a coordinate of the first touch, P2 is a coordinate of the second touch, xm is a first coordinate of the central point, ym is a second coordinate of the central point, dx is a first distance between the first and second touches in the first direction, and dy is a second distance between the first and second touches in the second direction.

9. A touch panel assembly, comprising:
a touch panel comprising a first substrate and a second substrate, wherein the first and second substrates overlap with each other, the first substrate comprises at least one first touch electrode, and the second substrate comprises at least one second touch electrode; and
a touch panel driver configured to:
detect a touch cell among a plurality of touch cells, wherein the plurality of touch cells are defined by a plurality of areas in the touch panel in which the first and second touch electrodes overlap with each other,
detect a touch position in the detected touch cell based on a first electrical signal measured at at least one of a plurality of terminals of the first and second touch electrodes,
determine a number of touches based on a distance between a first touch and a second touch,
determine expected touch coordinates, wherein the expected touch coordinates correspond to the touch position when the number of touches is one, and the expected touch coordinates are based on a central point between the first and second touches and the distance between the first and second touches when the number of touches is two,
determine a touch coordinate from among the expected touch coordinates based on a voltage measured at at least one of the plurality of terminals of the first and second touch electrodes, and
drive the touch panel,
wherein the first touch electrode comprises a first terminal extending along a first side of the first touch electrode in a first direction, and a second terminal extending along a second side of the first touch electrode in the first direction, wherein the first and second sides of the first touch electrode oppose each other, and
the second touch electrode comprises a third terminal extending along a first side of the second touch electrode in a second direction crossing the first direction, and a fourth terminal extending along a second side of the second touch electrode in the second direction, wherein the first and second sides of the second touch electrode oppose each other,
wherein the touch panel driver is configured to determine the touch coordinate from among the expected touch coordinates based on a first voltage measured at the third terminal and a second voltage measured at the fourth terminal while a source voltage is applied to the first terminal and a ground voltage is applied to the second terminal,
wherein the touch panel driver is configured to determine the touch coordinate from among the expected touch coordinates based on a single difference between the first and second voltages while the source voltage is applied to the first terminal and the ground voltage is applied to the second terminal, in response to determining that the number of touches is two, and
wherein a first expected touch coordinate is determined as the touch coordinate when the first voltage is greater than the second voltage and a second expected touch coordinate is determined as the touch coordinate when the second voltage is greater than the first voltage.

10. The touch panel assembly of claim 9, wherein the first substrate comprises at least two first touch electrodes, and the first and second touch electrodes overlapping with each other form at least two cells.

11. The touch panel assembly of claim 9, wherein the second substrate comprises at least two second touch electrodes, and the first and second touch electrodes overlapping with each other form at least two cells.

12. The touch panel assembly of claim 9, wherein the first touch electrode extends in the first direction, the second touch electrode extends in the second direction, the first substrate comprises at least two first touch electrodes, the second substrate comprises at least two second touch electrodes, and the first and second touch electrodes overlapping with each other form at least four cells.

13. The touch panel assembly of claim 9, wherein the first electrical signal is a voltage.

14. The touch panel assembly of claim 9,
wherein the expected touch coordinates comprise a first coordinate when the number of touches is one, and the expected touch coordinates comprise a second coordinate and a third coordinate when the number of touches is two, and
the touch panel driver is configured to determine the touch coordinate by selecting the first coordinate as the touch coordinate when the number of touches is one, or selecting one of the second coordinate and the third coordinate as the touch coordinate when the number of touches is two based on voltages measured at two terminals of the second touch electrodes.

15. The method of claim 1, wherein the expected touch coordinates comprise a first coordinate when the number of touches is one, and the expected touch coordinates comprise a second coordinate and a third coordinate when the number of touches is two, and
determining the touch coordinate comprises selecting the first coordinate as the touch coordinate when the number of touches is one, or selecting one of the second coordinate and the third coordinate as the touch coordinate when the number of touches is two based on voltages measured at two terminals of the second touch electrodes.

* * * * *